(12) United States Patent
van Bree et al.

(10) Patent No.: US 8,119,993 B2
(45) Date of Patent: Feb. 21, 2012

(54) METHOD FOR DETECTING CONTAMINATION ON A MOVING OBJECT

(75) Inventors: Daan van Bree, Meppel (NL); Ingo Koelln, Hamburg (DE)

(73) Assignee: Mirion Technologies (Rados) GmbH, Hamburg (DE)

( * ) Notice: Subject to any disclaimer, the term of this patent is extended or adjusted under 35 U.S.C. 154(b) by 0 days.

(21) Appl. No.: 12/881,951

(22) Filed: Sep. 14, 2010

(65) Prior Publication Data

US 2011/0266454 A1 Nov. 3, 2011

(30) Foreign Application Priority Data

Sep. 15, 2009 (DE) .......... 10 2009 042 056

(51) Int. Cl.
*G01J 1/42* (2006.01)

(52) U.S. Cl. .......... 250/395

(58) Field of Classification Search .......... 250/395, 250/340
See application file for complete search history.

(56) References Cited

U.S. PATENT DOCUMENTS 5,416,330 A * 5/1995 Abul-Faraj et al. .......... 250/395

\* cited by examiner

*Primary Examiner* — Kiho Kim
(74) *Attorney, Agent, or Firm* — Vidas, Arrett & Steinkraus P.A.

(57) ABSTRACT

A method for detecting contamination on a moving object moving in a longitudinal direction past a plurality of detectors, wherein
during the movement of the object past the detectors, a count rate is recorded repeatedly at each of the detectors, and
before an evaluation whether contamination is present, the recorded count rates are subjected to a validity test as to whether the count rates recorded by the detectors belong to a class of predetermined reference patterns for the count rates.

6 Claims, 2 Drawing Sheets

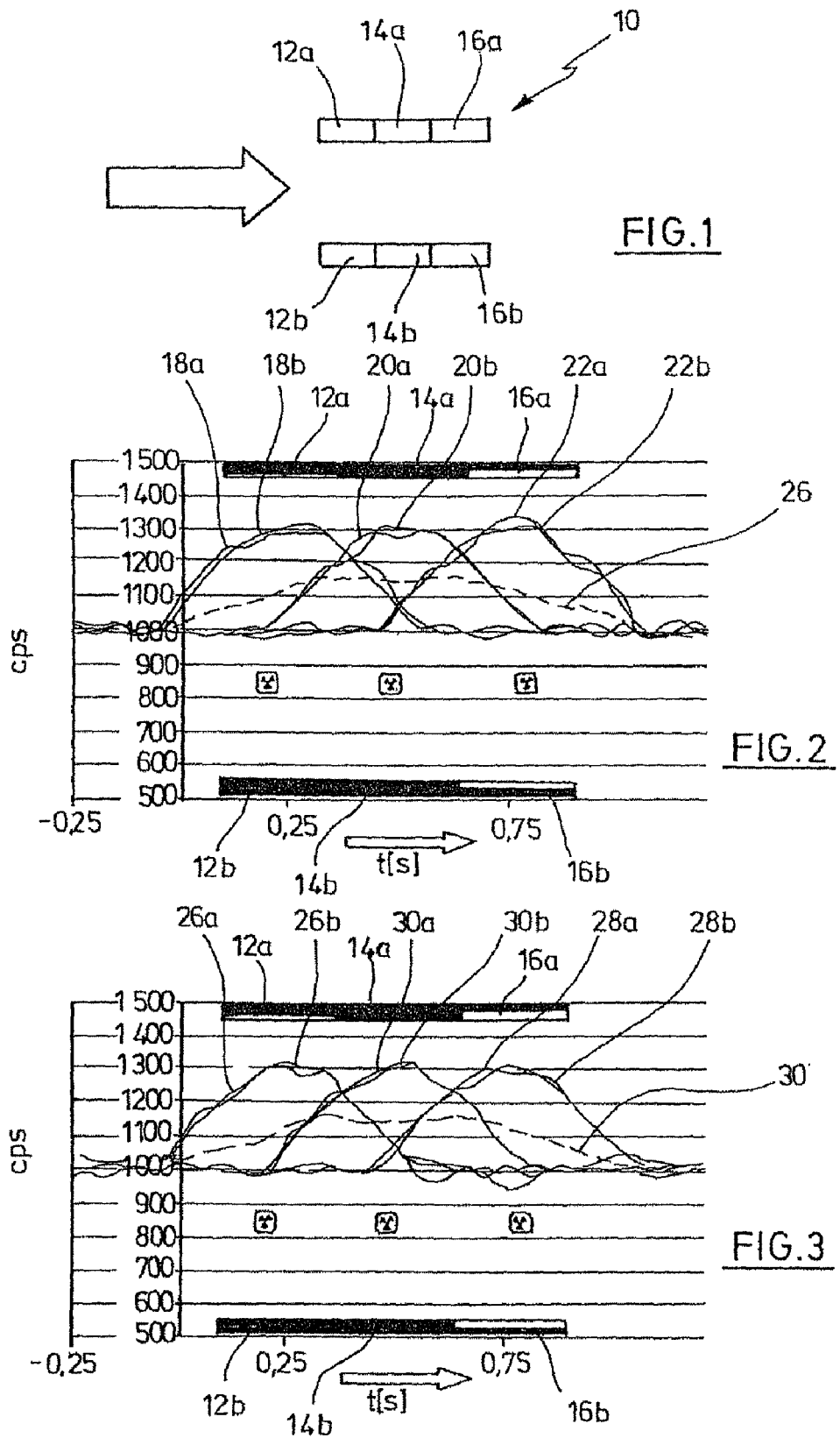

METHOD FOR DETECTING CONTAMINATION ON A MOVING OBJECT

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention relates to a method for detecting contamination on a moving object moving in a longitudinal direction past a plurality of detectors.

It is customary to perform inspections for the transport of radioactive sources at the entrances and exits of nuclear facilities, but also at border crossings, airports, or in general, at entrances and exits of buildings or regions. The inspections performed serve, on the one hand, for protecting people and on the other hand, can also uncover the illegal transport of radioactive material. These two aspects for detecting contamination are combined in the following when speaking of objects to be detected or inspected. Typically the objects to be inspected, which can be people, freight and/or vehicles, are led through a so-called portal monitor, in which detectors for gamma radiation and/or gamma and neutron radiation are provided transverse to the direction of movement.

In the case of a steady flow of objects to be inspected, the portal monitor used can become a chokepoint at which a bottleneck forms. In the case of inspecting people at entrances and exits, wait times arise. Also with container inspections, for example, at ports, the wait time can result in a slow-down in the processing of containers. False alarms, in which the portal monitor wrongly indicates contamination, are a possible cause of such wait times.

An object of the invention is to provide a method and a measurement apparatus for detecting contamination on a moving object that with the most simple means possible avoids false alarms and allows an exact measurement.

With the method according to the invention, the contamination is detected on an object moving in a longitudinal direction past a plurality of detectors. According to the invention, a count rate is recorded repeatedly by each detector during the movement of the object past the detectors disposed consecutively in the longitudinal direction. The recorded count rates are subjected to a validity check before an evaluation to determine whether contamination is present. The evaluation of the recorded count rates can occur in a known manner. For the validity check, count rates recorded by the detectors are compared to a class of pre-determined reference patterns for the count rates. A temporal progression of the count rate originates at each of the detectors as a result of the repeated recording of the count rate at the detectors. This temporal progression of the count rates is considered as a pattern and can be compared to predetermined reference patterns. Algorithms for pattern detection that compare congruence in the patterns, but are not dependent on concrete values of count rates, can be used here. Comparing to the reference patterns can ensure that only plausible count rates are supplied for evaluation with regard to a radiation exposure. If during the validity testing it is recognized that the recorded sample does not belong to a class of predetermined reference patterns, a signal can be generated that an error is present in the recorded count rates. This makes it necessary to repeat the measurement procedure for the object. If the validity testing determines that the recorded count rates are plausible these can be evaluated in order to attained a reliable measurement result. False alarms are avoided using the validity testing because only plausible measurement data are evaluated. Apart from that, the results of the evaluation of the count rates are also improved because only plausible count rates are evaluated. It can also be provided that specific count rates which were determined as plausible are supplied to a particular evaluation.

In a preferred further development of the method, the class of reference patterns comprises the temporal sequence in which maxima in the count rates have occurred at the detectors. The reference pattern can contain, for example, as a temporal sequence of the detectors 1, 2, 3, 4 . . . , wherein the implication of the reference pattern is that a maximum has occurred temporally consecutively in the count rates at the detectors 1, 2, 3, 4 . . . . With this further development of the method, for the validity testing the temporal sequence of detectors, in which maxima have occurred in the count rates, is determined from the recorded count rates. An error is then detected in the validity testing if the temporal sequence of the detectors determined from the recorded count rates is not contained in the class of the reference patterns. By comparing the class of the reference patterns, cases can therefore be excluded in which, for example, a detector located further to the rear already indicates a maximum that should have occurred only later, when the object has reached this detector. The validity testing then indicates that implausible count rates were recorded, and generates a corresponding warning signal.

In a further preferred embodiment, the temporal progression of the recorded count rates at the individual detectors is compared to the temporal progression of reference patterns using pattern detection. With the use at portal monitors, in which an object with or without sources of radiation is moved past the detectors in the longitudinal direction, a characteristic temporal progression of count rates arises in the case of the presence of a radioactive radiation. If the recorded temporal progression of count rates at one of the detectors deviates from the progressions of the reference patterns, it can be recognized that non-plausible count rates are present.

In a preferred embodiment, the class of reference patterns also comprises count rates, in which in at least one of the detectors there is a reduction of the count rate below an average value of the background count rate. This phenomenon occurs when a massive object moves past the detectors. In this case, a shielding of the background radiation occurs so that the background count rate is initially reduced. Preferably the class of the reference pattern comprises also count rates in which at one detector there is an increase in the count rate after a reduction below the average value of the background count rate. This is the case, for example, when a massive object is located in front of the detector because then the background radiation is initially shielded, and subsequently the increased net count rate due to the radiation source is recorded.

In a preferred further development of the method according to the invention, when the count rates of the individual detectors indicate a lowering beneath the value of an average background count rate, it is adjusted to the value of the increase of the count rate, for evaluating the count rate. With the help of the validity testing it can be ensured here that count rates with this characteristic progression are present, so that this is taken into consideration during the evaluation.

BRIEF DESCRIPTION OF THE SEVERAL VIEWS OF THE DRAWINGS

Preferred exemplary embodiments are explained in the following using the figures. They show:

FIG. 1: a schematic view of a portal monitor that is suited for performing the method, FIG. 2: the temporal progression of the three count rates that were recorded at a portal monitor according to FIG. 1 in the presence of a contamination, FIG. 3: the temporal progression of count rates that were detected as not plausible.

DETAILED DESCRIPTION OF THE INVENTION

Figure 4:
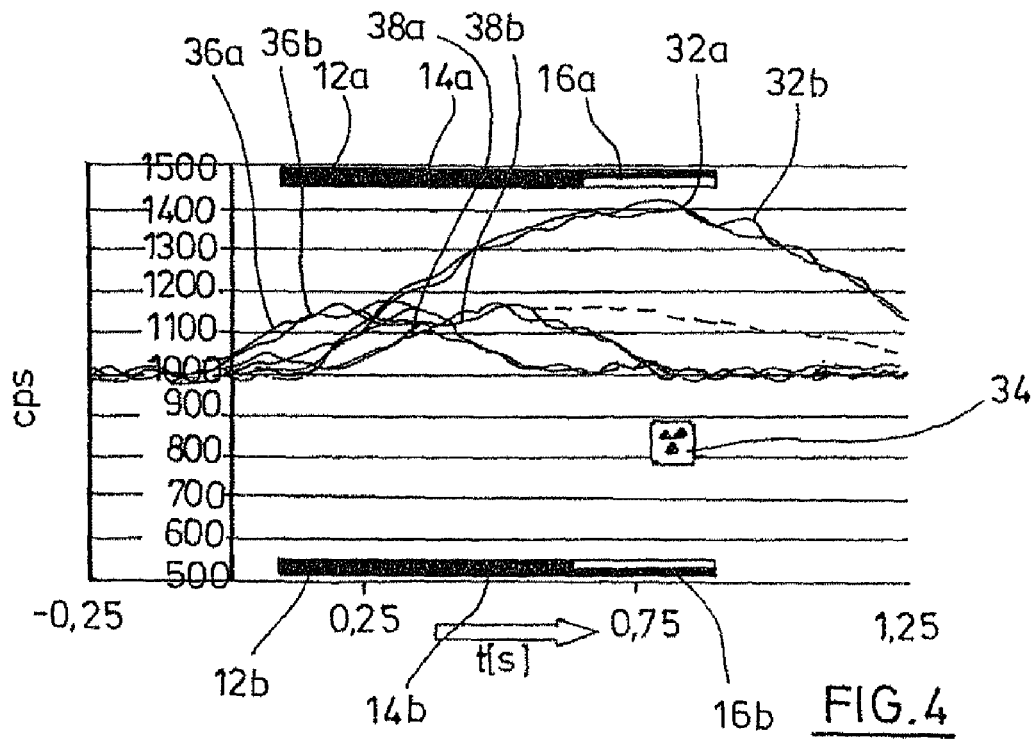
FIG. 4: the temporal progression of count rates in the case of contamination in the foot/leg area of a person.

While this invention may be embodied in many different forms, there are described in detail herein a specific preferred embodiment of the invention. This description is an exemplification of the principles of the invention and is not intended to limit the invention to the particular embodiment illustrated.

FIG. 1 shows a schematic view of a portal monitor 10 having three detector pairs 12, 14, and 16. Each detector pair comprises a pair of detectors 12*a*, 12*b*; 14*a*, 14*b*; 16*a*, 16*b* disposed across from each other. The detectors can be plastic scintillation detectors and $^3$He tube neutron detectors. In principle, other detectors suitable for use in portal monitors can also be used.

FIG. 2 shows a temporal progression of count rates 18*a*, 18*b*, 20*a*, 20*b*, 22*a*, 22*b* that result from moving a radioactive sample through the portal monitor. Here, the count rate 18*a* corresponds to the count rate that is recorded at the detector 12*a*. The count rates occurring at the detector 12*a* are recorded repeatedly during the movement of the sample through the portal monitor, so that temporally successive different count rates result. It is clearly evident from the count rate 18*a* that the count rate at the detector 12*a* increases with the entrance of the sample into the portal monitor, a maximum occurs when the sample is located directly in front of the detector 12*a*, and decreases again when the sample moves further through the portal monitor. The count rate 18*a* shows, for example, when the sample is located at the third detector pair 16*a*, 16*b*, the background radiation again of approximately 1000 cps. The count rate 18*b*, which occurs at the detector 12*b*, behaves analogously. It can be seen also that the count rates 20*a* and 20*b*, which occur at the detectors 14*a*, 14*b*, begin later and also have a maximum when the sample is located directly in front of the detectors 14*a* and 14*b*. The count rates 22*a* and 22*b* are recorded at the detector pair 16*a* and 16*b*, and also have a maximum when the sample is located directly in front of the detectors 16*a* and 16*b*.

The progression of the count rates shown in FIG. 2 is plausible because the detectors 12*a*, 12*b*, 14*a*, 14*b* and 16*a*, 16*b* each react in succession to the probe, and each show approximately the same progression. The acquired count rates can then be supplied to an evaluation.

FIG. 2 also shows a cumulative count rate that is formed when the count rates of all detectors are formed. It can be clearly seen that the average count rate 24 clearly has a lower progression. This is due to, among other reasons, that when the detector pair 12*a* and 12*b*, for example, records a maximum in the count rate, the detector pair 16*a* and 16*b* only measures a background rate so that the average of the count rates between the detector pairs 12*a*, 12*b* and 16*a*, 16*b* leads to the lower count rate 24.

FIG. 3 shows as an example the progression of count rates that is not plausible. In FIG. 3, the count rates 26*a*, 26*b* originate from the detector pair 12*a*, 12*b*, the count rates 30*a*, 30*b* originate from the detector pair 16*a*, 16*b*, and the count rates 28*a*, 28*b* originate from the detector pair 14*a*, 14*b*. In FIG. 3, the maximum of the count rates 30*a*, 30*b* occurs before the maximum of the count rates 28*a*, 28*b*. This means that the radioactive sample is initially located in front of the detector pair 12*a*, 12*b* and then in front of the detector pair 16*a*, 16*b*, and only subsequently in front of the center detector pair 14*a*, 14*b*. Assuming that the sample moves through the portal monitor, values are present that are not plausible. In this case, the portal monitor triggers a signal which indicates the presence of implausible count rates. This signal can cause the measurement to be repeated, or can serve as an indication to check the function of the portal monitor. For the object in which such count rates occur in an incorrect temporal progression, it is also possible to perform a special and more exact measurement. In the comparison of the individual count rates it is important that the cumulative count rate 30 here has a very similar progression to the cumulative count rate 24. A customary portal monitor would therefore in this situation not detect any deviation or anomaly, and the averaged count rate 30 would be evaluated without testing the peculiarity of the incorrect temporal progression.

FIG. 4 shows a further case in which there is a peculiarity with the sample. A person, having radioactive contamination in the foot or leg area, enters into the portal monitor, during which the contaminated foot or leg area moves swiftly past the first two detector pairs 12*a*, 12*b* and 14*a*, 14*b*, and comes to rest in front of the third detector pair 16*a*, 16*b*. An increased count rate 32*a*, 32*b* occurs then at the third detector pair 16*a*, 16*b*. The evaluation of this count rate yields that the count rate is significantly above the background count rate, and therefore contamination is present. This is indicated in FIG. 4 by the symbol 34. At the same time, it can also be seen in FIG. 4 that the count rates 36*a*, 36*b* and 38*a*, 38*b* from the detector pairs 12*a*, 12*b* and 14*a*, 14*b* do not increase. Due to the movement of the leg and the swinging, and the entrance of the person into the portal monitor, the sample moves swiftly pass the detectors 12*a*, 12*b* and 14*a*, 14*b*, so that their count rate increase only slightly. With the method according to the invention, this progression of the count rates is identified as plausible and evaluated using the count rates 32*a* and 32*b*. Alternatively, it is also possible that a warning signal is generated in order to repeat the measurement procedure.

Figure 5:
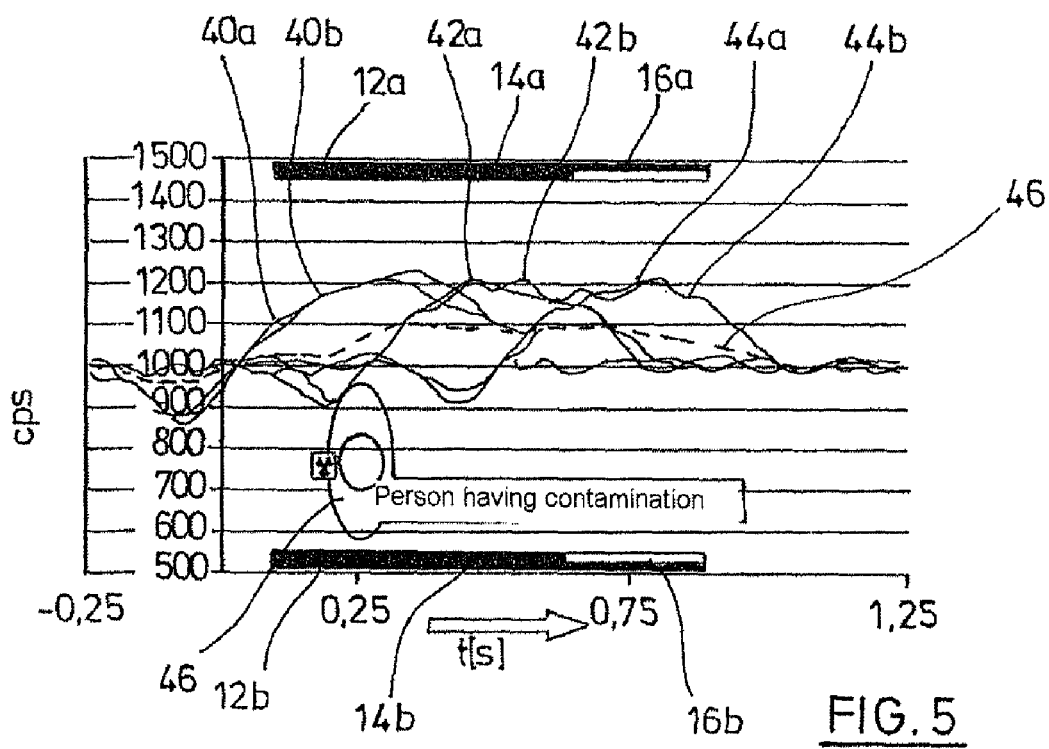
FIG. 5: the temporal progression of the count rates in the case of a contaminated person.

FIG. 5 shows the temporal progression of the count rates 40*a*, 40*b* and also count rates 42*a*, 42*b*, and 44*a*, 44*b*. With these count rates it is characteristic that the count rate initially falls below the background count rate. In the example shown, the count rates decrease, for example, to the value 900 cps, whereas the average count rate otherwise lies at approximately 1000 cps. It can be clearly seen, for example, in the count rates 40*a*, 40*b* that the count rate initially decreases and subsequently increases to the count rate of 1200 cps. This can occur, for example, when a person 46 enters into the portal monitor and initially shields the detectors from the background radiation. In this case, the detector count rates decrease. The contamination is shown only then by the increase of the count rates 40*a*, 40*b*. In the method according to the inventions, such a progression of the count rates 40*a*, 40*b*, 42*a*, 42*b* and 44*a*, 44*b* is identified as plausible. At the same time it can be ensured that these count rates are not only evaluated for their maxima, but rather, for example, are evaluated with a decreased background rate. The effect of shielding cannot be recognized for the progression of the cumulative count rate 46, so that a customary portal monitor would also evaluate this data with a count rate that is not decreased.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method for detecting contamination on a moving object that moves in a longitudinal direction past a plurality of detectors,
   characterized in that during the movement of the object past the detectors (12*a*, 12*b*, 14*a*, 14*b*, 16*a*, 16*b*), a count rate is recorded repeatedly by each of the detectors, and before an evaluation as to whether contamination is present, the recorded count rates are subjected to a validity test as to whether the count rates recorded by the detectors belong to a class of predetermined reference patterns for the count rates.

2. The method according to claim 1, wherein the class of reference patterns has a temporal sequence in which, maxima have occurred in the count rates at the detectors, and for the validity test, from the recorded count rates, the temporal sequence of the detectors is determined at which maxima occurred in the count rates, wherein an error is then detected if the temporal sequence of the detectors determined is not contained in the class of reference patterns.

3. The method according to claim 1, wherein that the temporal progression of the recorded count rates at the individual detectors is compared to the temporal progression of reference patterns using pattern detection.

4. The method according to claim 3, wherein the class of reference patterns also comprises count rates, in which in the count rate of a detector there is a reduction of the count rate below an average value of the background count rate.

5. The method according to claim 4, wherein the class of reference patterns also comprises count rates, in which in the count rate of a detector there is an increase in the count rate after a decrease below the average value of the background count rate.

6. The method according to claim 5, wherein if the recorded count rates show a decrease below the value of the average background count rate, for evaluation, the count rate is adjusted to an amount of the increase of the count rate.

* * * * *